2,899,348
Patented Aug. 11, 1959

2,899,348

CEMENTS FOR BONDING HIGH POLYMER SHEETS TO EACH OTHER AND METHOD OF USING SAME

Sterling S. Sweet and Maurice H. Van Horn, Rochester, N.Y., assignors to Eastman Kodak Company, Rochester, N.Y., a corporation of New Jersey No Drawing. Application April 30, 1954
Serial No. 426,906

10 Claims. (Cl. 154—136)

This invention relates to new compositions of matter containing high polymers dissolved in halogenated acetic acids or mixtures thereof, and more particularly to compositions containing high polymers dissolved in trifluoroacetic acid, or in dichloroacetic acid or suitable mixtures thereof. The invention further relates to sheets, films, fibers and cements which can be made from such high polymer solutions.

We have found in accordance with our invention that trifluoroacetic (B.P. 72° C.) dissolves cellulose and re-generated cellulose, cellulose nitrate, cellulose acetates of all acetyl contents, including the triacetate, "Vinyon N" (a copolymer of acrylonitrile and vinylchloride), methyl and ethyl cellulose, polyvinyl acetate, "Vinylite X" (polyvinyl butyral resin), methyl methacrylate, gelatin and zein. Solutions containing as much as 25 grams of solute per 100 grams of solvent are suitable for forming films by a coating process and for spinning filaments.

We have also found that dichloroacetic acid (B.P. 185° C.) has somewhat less solvent power but allows the preparation of solutions containing as much as 18 grams of solute per 100 grams of solvent for "Vinyon N," methyl and ethyl cellulose, zein and a cellulose acetate from the triacetate down to one containing 24% acetyl.

Mixtures of trifluoroacetic acid and dichloroacetic acid may also be employed as solvents for these high polymers.

An object therefore of the present invention is to provide new compositions of matter comprising one or more of the above recited high molecular weight materials in a solvent consisting of trifluoroacetic acid or dichloroacetic acid, or mixtures thereof.

Another object of this invention is to provide a film or sheet containing a high polymer selected from those recited above and trifluoroacetic acid or dichloroacetic acid or mixtures thereof.

Yet another object of this invention is to provide a cement for cementing together sheets and films of polyethylene glycol terephthalate and other polyesters.

Other objects of the invention are to provide processes for producing filaments, yarn, sheets and film from solutions containing a high polymer selected from those recited above and trifluoroacetic acid or dichloroacetic acid or mixtures of these solvents.

Other objects will appear hereinafter.

The invention is further illustrated in the following examples.

Example 1

Twenty grams of dry cellulose triacetate (44.5% acetyl) was dissolved in 100 grams of trifluoroacetic acid at room temperature in 2–3 hours. A clear, colorless, viscous solution was obtained which was coated on a glass plate, forming a clear sheet on curing 16 hours at 70° C.

Example 2

Twenty grams of dry, acetone-soluble cellulose acetate (40.5% acetyl) was dissolved in 100 grams of trifluoroacetic acid at room temperature (25° C.) in 2–3 hours. A clear, colorless, viscous solution was obtained which was coated in the usual manner on a glass plate, forming a clear sheet on curing 16 hours at 70° C.

Example 3

Twenty grams of a dry, water-soluble cellulose acetate (16.5% acetyl) was dissolved in 100 grams of trifluoroacetic acid at room temperature (25° C.) in 2–3 hours. A clear, colorless, viscous solution was obtained which was coated on a glass plate, forming a clear flexible film on curing 16 hours at 70° C. A film .005-inch thick was found to have the following values:

| | |
|---|---|
| M.I.T. folds | 36 |
| Research tear | 60 |
| Tensile strength p.s.i. | 7280 |
| Elongation percent | 5 |

Example 4

Twenty grams of a dry, flake-powdered or sheet gelatin was dissolved in 100 grams of trifluoroacetic acid at room temperature in 2–3 hours. A clear colorless solution was obtained which was coated on a glass plate, forming a clear sheet on curing 16 hours at 70° C.

Example 5

Five grams of dry, absorbent cotton was dissolved in 100 grams of trifluoroacetic acid at 70° C. A clear solution was obtained which was coated on a glass plate, forming a clear sheet on curing 16 hours at 70° C.

Example 6

Ten grams of dry methyl methacrylate were dissolved in 100 grams of trifluoroacetic acid at room temperature in 2–3 hours. The clear, colorless solution obtained was coated on a glass plate, forming a clear, flexible sheet on curing 16 hrs. at 70° C.

| | |
|---|---|
| M.I.T. | 124 |
| Research tear | 20 |
| T.S. p.s.i. | 3000 |
| Elongation percent | 20 |

Example 7

Ten grams of dry "Vinylite X" (polyvinyl butyral) were dissolved in 100 grams of trifluoroacetic acid at room temperature in 2–3 hours. The clear solution obtained was coated on a glass plate, forming a clear, slightly brown flexible sheet on curing 16 hrs. at 70° C.

| | |
|---|---|
| M.I.T. folds | 1000 (stretchy) |
| Research tear | 210 |
| T.S. p.s.i. | 1800 |
| Elongation percent | 80 |

Example 8

Ten grams of dry cellulose acetate propionate (30% acetyl and 14% proponyl) were dissolved in 100 grams of trifluoroacetic acid at room temperature in 2–3 hours. The clear, colorless solution was coated on a glass plate, forming a clear flexible sheet on curing 16 hrs. at 70° C.

| | |
|---|---|
| M.I.T. folds | 60 |
| Research tear | 20 |
| T.S. p.s.i. | 2800 |
| Elongation percent | 8 |

Example 9

Ten grams of dry polyvinyl acetate were dissolved in 100 gms. of trifluoroacetic acid at room temperature in 2–3 hours. The clear solution was coated on a glass plate, forming a clear flexible (stretchy) sheet on curing 16 hrs. at 70° C.

Example 10

Five grams of dry cellulose triacetate (44.5% acetyl) were dissolved in 100 grams of trifluoroacetic acid at 70° C. in 2–3 hours. A clear, slightly colored, viscous solution was obtained, which was coated on a glass plate, forming a clear sheet on curing 16 hrs. at 70° C.

Example 11

A strip of uncoated cellulose acetate film was spliced to a similar strip by overlapping the joint ⅛ to ¼ inch, and applying trifluoroacetic acid between the adjacent overlapped surfaces. The surfaces were pressed lightly together for 2 to 5 seconds. A tight, tenacious, joint was obtained.

Example 12

A strip of emulsion coated 35 mm. cellulose acetate film was attached to a sheet of white paper (raw photographic paper stock) by overlapping the joint about ¼ inch, applying a few drops of trifluoroacetic acid between the adjacent surfaces and pressing the surfaces together for 2 to 3 seconds.

Example 13

A strip of polyethylene glycol terephthalate was attached to another strip of the same material by overlapping the joint ⅛ to ¼ inch, applying a few drops of trifluoroacetic acid between the adjacent strips and pressing the sheets together.

Example 14

Examples 11, 12 and 13 were repeated employing a mixture of trifluoroacetic acid and dichloroacetic acid in a ratio of 1:1 and a tenacious bond between the respective sheets was obtained.

Example 15

Examples 11, 12 and 13 were repeated employing a film cementing composition containing trifluoroacetic acid and 20% of one of the following materials: cellulose acetate, polyvinyl acetate, methyl methacrylate, polyvinyl butyral, ethyl cellulose, Vinylite X, Vinyon N, cellulose, gelatin and zein and satisfactory bonds between the respective sheets were obtained.

Example 16

Examples 11, 12 and 13 were repeated employing a film cementing composition containing dichloroacetic acid and 20% of one of the following materials: cellulose acetate, polyvinyl acetate, methyl methacrylate, polyvinyl butyral, ethyl cellulose, Vinylite X, Vinyon N, cellulose, gelatin and zein and satisfactory bonds between the respective sheets were obtained.

Example 17

Examples 11, 12 and 13 were repeated employing a film cementing composition containing a mixture of dichloroacetic acid and trifluoroacetic acid in a proportion of 1 to 1, and 20% of one of the following materials: cellulose acetate, polyvinyl acetate, methyl methacrylate, polyvinyl butyral, ethyl cellulose, Vinylite X, Vinyon N, cellulose, gelatin and zein and satisfactory bonds between the respective sheets were obtained.

All mixtures of trifluoroacetic acid and dichloroacetic acid can be used for splicing, but it is advisable not to use more than fifty parts dichloracetic acid because of its low volatility.

Example 18

The following materials were also cemented together tenaciously with the above-described cementing compositions.

Cellulose triacetate spliced to polyethylene glycol terephthalate base
Gelatin film to gelatin film
Ethyl cellulose to ethyl cellulose
Cellulose acetate butyrate to cellulose acetate butyrate
Butyl resinic lactone to butyl resinic lactone
Emulsion-coated base to emulsion-coated base
Cellulose triacetate to cellophane
Vinyon N to Vinyon N

Example 19

Trifluoroacetic acid can also be used to splice the following films:

Polyethylene glycol terephthalate to gelatin
Polyethylene glycol terephthalate to ethyl cellulose
Poyethylene glycol terephthalate to celluose acetate butyrate
Poyethylene glycol terephthalate to cellophane
Polyethylene glycol terephthalate to cellulose acetate propionate
Cellulose triacetate to gelatin
Cellulose triacetate to ethyl cellulose
Cellulose triacetate to cellulose acetate butyrate
Cellulose triacetate to cellophane
Cellulose acetate propionate to cellulose acetate propionate For specific uses, the short and long term volatility of the solvent combination can be adjusted by changing the ratio of the two halogenated acetic acids and the proportion of dissolved resin.

We claim:

1. A new composition of matter comprising a compound selected from the group consisting of cellulose acetate and cellulose triacetate dissolved in a solvent selected from the group consisting of trifluoroacetic acid and dichloroacetic acid and their mixtures.

2. A new composition of matter containing 20 grams of cellulose triacetate (44.5% acetyl) dissolved in 100 grams trifluoroacetic acid.

3. A new composition of matter containing 20 grams of cellulose acetate (40.5% acetyl) dissolved in 100 grams trifluoroacetic acid.

4. A new composition of matter containing 20 grams cellulose acetate (16.5% acetyl) dissolved in 100 grams of trifluoroacetic acid.

5. A new composition of matter containing 5 grams of cotton dissolved in 100 grams trifluoroacetic acid.

6. The method of cementing an article of polyethylene glycol terephthalate to an article selected from the group consisting of gelatin, ethyl cellulose, cellulose acetate butyrate, regenerated cellulose, cellulose acetate propionate and polyethylene glycol terephthalate which comprises placing between the articles to be joined a cement comprising trifluoroacetic acid and pressing the articles together.

7. The method of cementing an article of cellulose triacetate to an article selected from the group consisting of gelatin, ethyl cellulose, cellulose acetate butyrate, regenerated cellulose and cellulose acetate propionate which comprises placing between the articles to be joined a cement comprising trifluoroacetic acid and pressing the articles together.

8. The method of cementing a sheet of high polymeric polyethylene terephthalate to another sheet of the same composition, which method comprises coating one of said sheets with a material selected from the group consisting of trifluoroacetic acid and dichloroacetic acid, and their mixtures, combining the said coated sheet with another sheet of high polymeric polyethylene terephthalate, and pressing said two sheets together.

9. The method of cementing a sheet of high polymeric polyethylene terephthalate to another sheet of the same composition, which method comprises coating one of said sheets with trifluoroacetic acid, combining the said coated sheet with another sheet of high polymeric polyethylene terephthalate, and pressing said two sheets together.

10. The method of cementing a sheet of high polymeric polyethylene terephthalate to another sheet of the same composition, which method comprises coating one of said sheets with dichloroacetic acid, combining the said coated sheet with another sheet of high polymeric polyethylene terephthalate, and pressing said two sheets together.

References Cited in the file of this patent

UNITED STATES PATENTS

| | | |
|---|---|---|
| 2,026,583 | Malm et al. | Jan. 7, 1936 |
| 2,045,161 | Muller et al. | June 23, 1936 |
| 2,056,787 | Henne | Oct. 6, 1936 |
| 2,062,403 | Dreyfus | Dec. 1, 1936 |
| 2,145,345 | Dreyfus | Jan. 31, 1939 |
| 2,339,012 | Hecht et al. | Jan. 11, 1944 |
| 2,359,202 | Coleman | Sept. 26, 1944 |
| 2,368,062 | Bogin | Jan. 23, 1945 |
| 2,379,236 | Jenkins | June 26, 1945 |
| 2,458,886 | Weeldenburg | Jan. 11, 1949 |
| 2,461,472 | Kaszuba | Feb. 8, 1949 |
| 2,607,703 | Resch et al. | Aug. 19, 1952 |
| 2,635,962 | Nadeau et al. | Apr. 21, 1953 |
| 2,675,339 | Zenftman | Apr. 13, 1954 |
| 2,716,637 | Bunting | Aug. 30, 1955 |

FOREIGN PATENTS

| | | |
|---|---|---|
| 680,879 | Germany | Sept. 12, 1939 |

OTHER REFERENCES

Ellis: "Chemistry of Synthetic Resins," 1935, vol. 1, page 13; vol. 2, page 1104.

Erbring: "Kolloid Zeitung," 1941, pp. 96, 336–340.

Ser. No. 263,258, Durr et al. (A.P.C.), published Apr. 20, 1943.

Castle: "Chemistry and Industry," Feb. 17, 1951, p. 129.

Chemical Abstracts, vol. 45, No. 12, June 25, 1951, "Cellulose and Paper," section 23, page 5403c.

The Merck Index, 6th ed., 1952; p. 969.